May 24, 1949.　　　　R. WATTS　　　　2,471,294
SHOCK ABSORBER

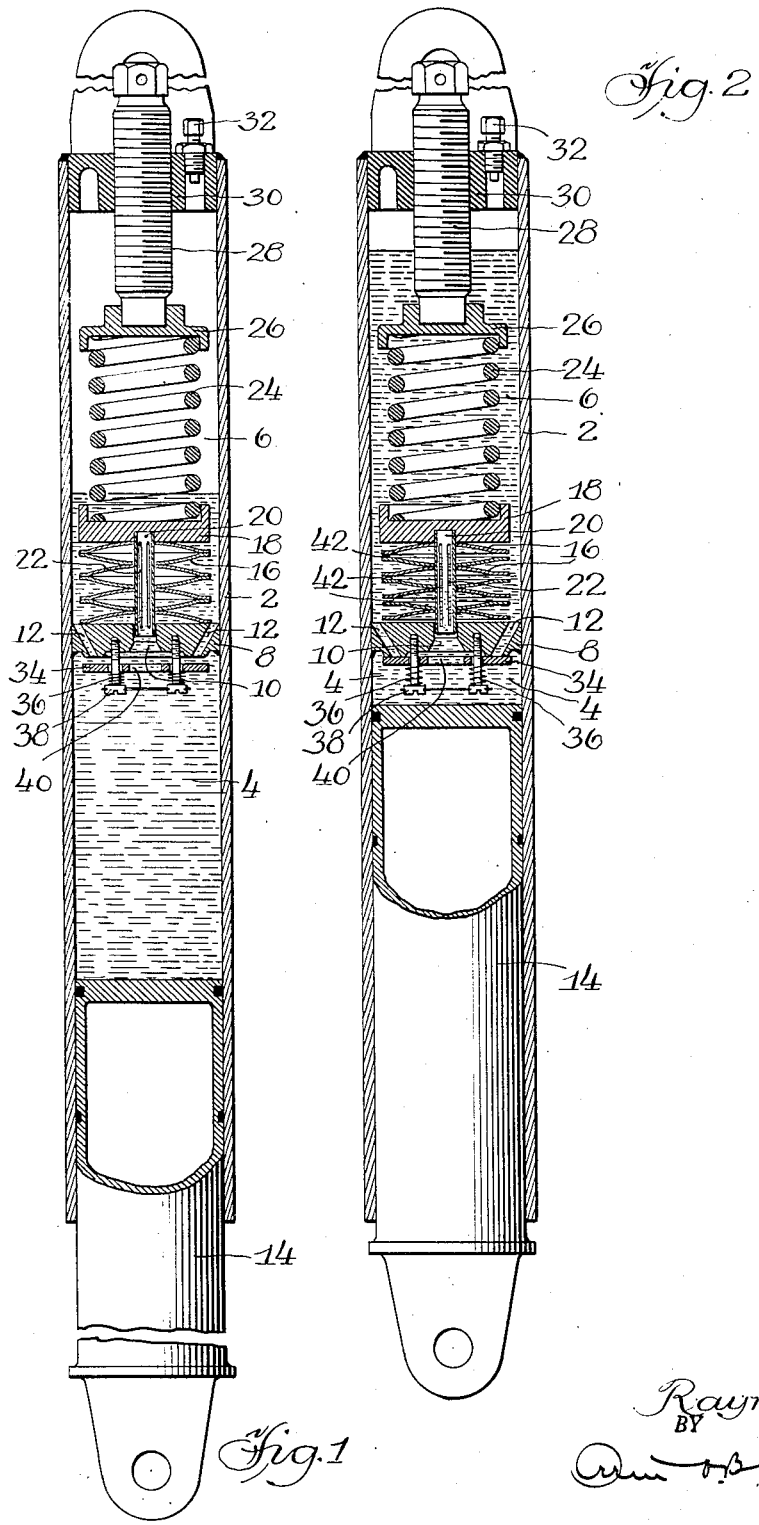

Filed Feb. 19, 1944　　　　2 Sheets-Sheet 2

INVENTOR.
Raymond Watts
BY
O. B. Garner
Atty.

Patented May 24, 1949

2,471,294

UNITED STATES PATENT OFFICE 2,471,294

SHOCK ABSORBER

Raymond Watts, Chicago, Ill., assignor to American Steel Foundries, Chicago, Ill., a corporation of New Jersey Application February 19, 1944, Serial No. 523,019

11 Claims. (Cl. 267—64)

My invention relates to valves such as may be utilized in oleo shock struts commonly employed in the connection between the landing gear and the fuselage of an aircraft.

The general object of my invention is to provide valve means for controlling the flow of fluid through a passage, said valve means comprising a series of annular discs having central openings aligned with said passage, means for urging said discs into abutment with each other for resisting flow of fluid through said passage, and means for permitting said discs to move apart, thus defining interstices or orifices therebetween in order to afford a relatively great valve area along which the fluid may flow, thus diminishing the velocity thereof and increasing the amount of friction developed.

My novel valve means may be utilized in an hydraulic shock absorber for metering the flow of hydraulic fluid through an orifice, or my novel valve means may be used for opening and closing the flow passage of a high pressure valve in order to decrease wear or abrasion of the valve parts, caused by the passage therethrough of fluid under high pressure.

Another object of my invention is to design a shock strut such as above described in which the fluid is forced through a metering valve assembly comprising a plurality of annular discs with aligned central openings through which fluid is forced, said discs being formed and arranged to move apart from each other to define interstices as above described.

In certain of the illustrated embodiments of my invention the discs are permitted to move apart from each other by means of their resilient construction, and in another illustrated embodiment the discs are nonresilient but are urged into engagement with each other by yielding means operable to permit the discs to move apart in response to the pressure of the fluid forced through the disc openings on the closure stroke of the strut.

A different object of my invention is to design a shock strut comprising a novel metering valve assembly such as above described in combination with a release or flapper valve operable to permit the fluid within the strut to by-pass the metering valve assembly on the release or expansion stroke of the strut, thus affording a rapid release action.

In the drawings,

Figure 1 is a sectional view taken on the longitudinal axis of an oleo shock strut embodying my invention, the conditions shown being those prevailing on the expansion or release stroke of the device.

Figure 2 is a sectional view comparable to Figure 1 but illustrating the conditions prevailing on the closure or compression stroke of the device.

Figure 3:
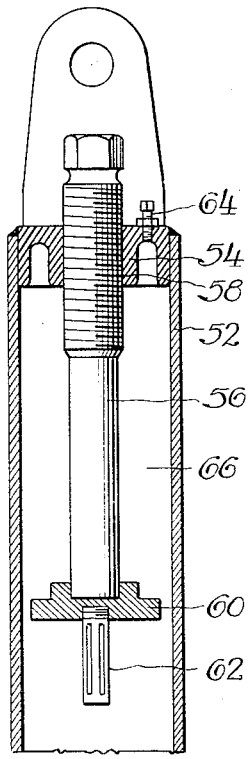
Figures 3 to 5 are fragmentary sectional views illustrating various modifications of the device shown in Figures 1 and 2.

Describing my invention in detail and referring first to the embodiment thereof illustrated in Figures 1 and 2, the shock strut disclosed therein comprises a top follower in the form of a cylinder 2 divided into two axially spaced chambers 4 and 6 by a bulkhead or wall 8 fixed to the cylinder 2 intermediate the ends thereof. The bulkhead 8 comprises the central passage or orifice 10 flaring at the lower extremity thereof to afford a smooth and rapid flow of fluid therethrough, and the bulkhead 8 also comprises a plurality of passages or openings 12, 12 spaced around the central passage 10.

The chamber 4 may be designated the working chamber inasmuch as the lower follower or piston 14 reciprocates therewithin for urging an hydraulic fluid medium, such as oil, through the passage 10 on the compression stroke of the device, as hereinafter more fully described. It will be understood that the slidable fit of the piston 14 within the cylinder 2 may be made fluid-tight by any suitable means, such as, for example, a packing ring of conventional form.

A metering disc valve assembly is mounted within the chamber 6 for metering the fluid on the compression or closure stroke of the device, and said assembly comprises a series of annular resilient dished discs 16, 16 compressed into a pile against the bulkhead 8 by the sprink cap member 18, which carries a tube 20 extending through the aligned central openings of the discs, said tube 20 being afforded a slidable fit within the passage 10 and being provided with a plurality of elongated slots 22, 22 communicating with the spaces or interstices between the discs 16, 16. It will be understood by those skilled in the art that the primary function of the tube 20 is to maintain the discs 16, 16 in alignment so that the openings therethrough are aligned with the passage 10, whereby on the compression stroke of the device the hydraulic fluid may flow through the opening 10 and through the central openings of the discs, as hereinafter more fully described; however, it will be understood that, if desired, other means may be substituted for maintaining the discs in their proper alignment with respect to the passage 10.

A spring 24 is adjustably compressed against the spring cap 18 by means of a spring cap 26 and a pin 28 in threaded engagement with the head 30 of the cylinder 2. The head 30 is provided with a fitting 32 by means of which air or other suitable gas may be compressed into the chamber 6 to afford an air spring for urging the piston 14 to open or expanded position after the closure stroke thereof, as will be clearly understood by those skilled in the art.

It will be understood that the discs 16 and the spring 24 constitute an elongated, pressure sensitive, axially expansible and contractible metering unit compressed between the wall 8 and the cap 26 which constitute abutments maintained in a predetermined fixed spaced relationship during operation of the shock strut. Thus the discs 16 are under substantially constant pressure except for variations in the pressure of the hydraulic fluid flowing through the interstices between the discs. The entire unit is adapted to expand and contract in response to variation in pressure in the metered fluid thereby accommodating substantially uniform friction absorption under varying load conditions and varying temperature conditions. Furthermore, the multiplicity of interstices between the discs 16 afford greater friction absorption than that heretofore possible and the uniform pressure to which the unit is subjected accommodates this great friction absorption while insuring substantially uniform performance under varying load conditions.

A flapper valve or release valve assembly is provided to facilitate the release or expansion stroke of the device, said assembly comprising an annular plate 34 resiliently mounted by means of springs 36, 36 on the stud bolts 38, 38 threaded into the bulkhead 8, said plate 34 having a central opening 40 aligned with the passage 10 through the bulkhead.

It will be understood that in assembling the shock strut illustrated in Figures 1 and 2, the parts are assembled in the positions illustrated therein, and the spring 24 is adjusted to the desired compression by means of the pin 28, thus resiliently urging the discs 16, 16 into a pile against the bulkhead 8. Thereafter, the piston 14 is moved to the full extent of its closure stroke, as illustrated in Figure 2, and a desired quantity of compressed air is pumped into the chamber 6 through the fitting 32, said compressed air being operable to urge the piston 14 to its normal released or expanded position, as shown in Figure 1, whenever the pressure on the strut is released.

On the compression or closure stroke of the device as seen in Figure 2, the piston 14 is advanced within the working chamber 4, thus forcing fluid through the passage 10, the passages 12, 12 being closed by the plate 34 which is urged against the bulkhead by hydraulic pressure built up against the plate as well as by the pressure of the springs 36, 36. As fluid passes through the passage 10 into the tube 20 and through the slots 22, 22 therethrough, the hydraulic pressure urges the discs 16, 16 into spaced relationship, thus forming interstices or orifices 42, 42 therebetween through which the fluid is metered as it passes into the chamber 6. It may be noted that in this embodiment of my invention the discs are resiliently constructed and by this means are permitted to move apart from each other, thus forming the before-mentioned interstices 42, 42.

On the release stroke of the device, as seen in Figure 1, the compressed air in the chamber 6, acting against the hydraulic fluid therein, urges the piston 14 to its open position, and as the piston 14 moves downwardly to its open or extended position, the hydraulic fluid passes through the passages 12, 12 inasmuch as the hydraulic pressure therein forces the valve plate 34 to its open position as seen in Figure 1.

Referring now to Figure 3, a modification of my invention is disclosed wherein nonresilient means is utilized for urging the discs into a pile against the bulkhead. In this modification the cylinder 52 comprises the head 54 through which the bolt or pin 56 extends in threaded engagement therewith as at 58. The pin 56 carries an abutment member 60 on which is mounted a tube 62 corresponding with the tube 20 previously described in connection with the embodiment illustrated in Figures 1 and 2. A fitting 64 is provided, through which compressed air may be admitted into the chamber 66, as in the previously described embodiment. It will be understood that the modification illustrated in Figure 3 is identical with that shown in Figures 1 and 2, except that the spring 24 is omitted, and thus the pin 56 is operable to exert a nonresilient force against the abutment member 60 which bears against the top disc of the disc assembly for urging the same against the bulkhead.

Figure 4:
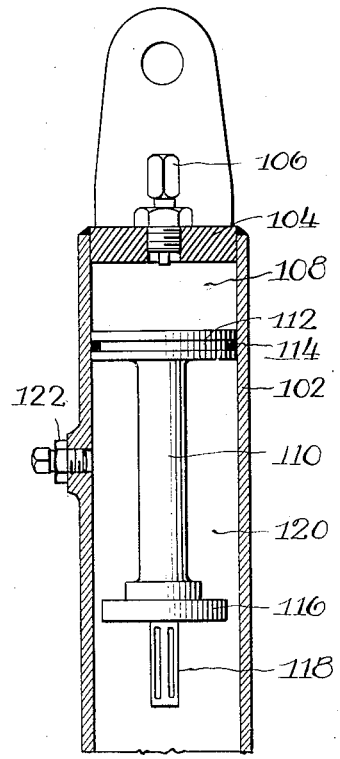

Figure 4 illustrates still another embodiment of my invention wherein the cylinder 102 comprises the head 104, provided with means herein illustrated as a fitting 106 through which compressed air may be admitted into the cylinder chamber 108, as in the previously-described embodiments. A pistonlike member 110 is reciprocal within the cylinder 102 and comprises the piston head 112 afforded a sliding airtight fit within the cylinder by means of the packing ring 114. The piston member 110 carries an abutment member 116 on which is mounted a tube 118, corresponding to the tubes 20 and 62 of the previously described embodiments. Beneath the piston head 112 is a space or chamber 120 within the cylinder, said chamber being provided with a fitting 122 through which compressed air may be admitted. It will be understood that in the embodiment illustrated in Figure 4, the aboutment member 116 is urged against the disc assembly by means of a predetermined amount of compressed air admitted into the chamber 108 through the fitting 106 or any other suitable means. A predetermined amount of compressed air is also admitted into the space 120 through the fitting 122, the pressure in the chamber 108 being initially greater than that in the chamber 120. Thus, on the compression stroke of the strut, the abutment member 116 is maintained in tight engagement with the disc assembly until a predetermined pressure is built up within the space 120 by means of the hydraulic fluid which is urged upwardly by the associated piston, as will be clearly understood by those skilled in the art. Thus, when a predetermined pressure has been built up within the space 120, the piston member 110 will be forced upwardly within the cylinder 102, thereby permitting the discs to move a predetermined distance apart from each other in order to afford a desired rate of flow between the discs.

Figure 5:
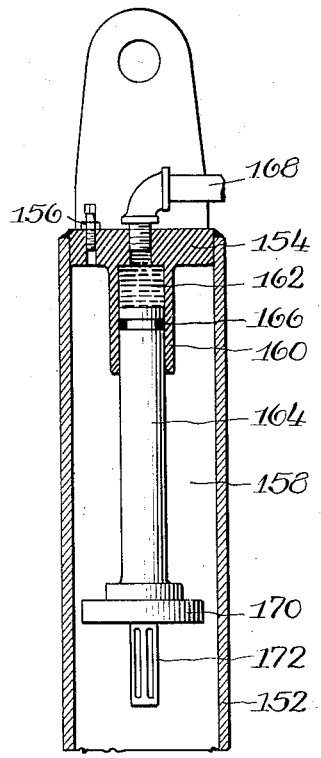

Figure 5 illustrates still another embodiment of my invention wherein the cylinder 152 comprises a head 154 having a fitting 156 through which compressed air may be admitted to the cylinder chamber 158. Mounted on the inner side of the head 154 is a tube 160 forming a small hydraulic cylinder 162 within which a pistonlike member 164 reciprocates, the engagement between the member 164 and the tube 160 being made substantially fluid-tight by means of a packing ring 166. Hydraulic fluid, such as oil, is admitted to the cylinder 162 by means of the conduit 168. The piston member 164 carries an abutment member 170 on which is mounted a tube 172, corresponding in design and function to those described for the previous embodiments of my invention. Thus, it will be understood that in the modification of Figure 5, the abutment member 170 is urged into engagement with the disc assembly by means of hydraulic fluid admitted to the cylinder 162 through the conduit 168.

Figure 6:
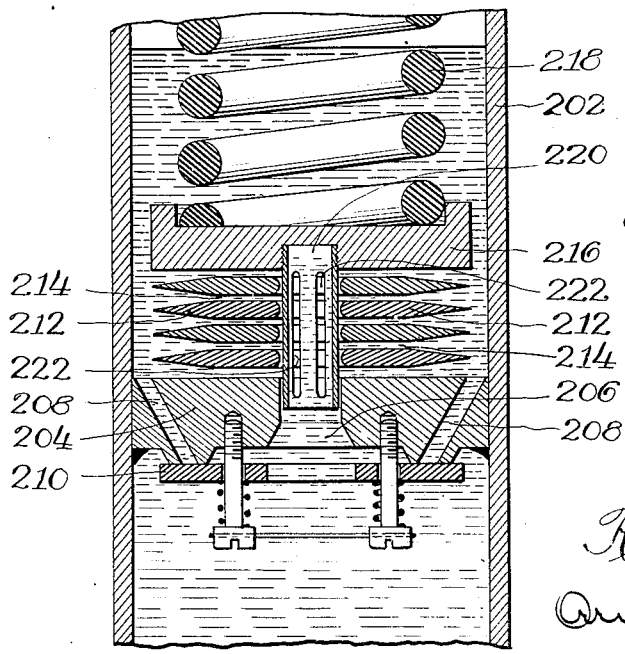
Figure 6 is a fragmentary sectional view generally comparable to Figure 2 but illustrating a modification of my novel shock strut shown on the closure stroke thereof.

Referring now to Figure 6, it will be seen that a further modification of my invention is disclosed, wherein the cylinder 202 is provided with a bulkhead or wall 204 having a central opening 206 and spaced passages 208, 208 therearound, said last-mentioned passages being opened and closed, respectively, on the expansion and compression stroke of the device by means of the flapper valve assembly 210, as in the embodiment of Figures 1 and 2.

A disc valve assembly is provided for metering the hydraulic medium as it flows through the passage 206 on the compression stroke of the device, said assembly comprising a series of annular discs 212, 212 defining interstices 214, 214 therebetween, said discs having central openings aligned with the passage 206 through the bulkhead. The discs 212, 212 are urged into a pile against the bulkhead by means of a spring cap 216 against which a compression spring 218 is adjustably compressed, as in the embodiment of Figures 1 and 2. The spring cap 216 carries a tube 220, extending through the aligned openings in the discs and afforded a sliding fit in the passage 206 for maintaining the disc openings in alignment therewith, said tube 220 having slots 222, 222 therethrough communicating with the central openings through the discs.

Thus, on the compression stroke of the strut, as illustrated in Figure 6, the flapper valve assembly 210 closes the passages 208, 208 through the bulkhead, and the hydraulic liquid is forced through the passage 206 and through the slots 222, 222 of the tube. The hydraulic pressure built up under these conditions is such that the discs 212, 212 are urged apart to open the interstices or orifices 214, 214 therebetween, the relative movement between the discs being yieldingly resisted by the spring 218, which is operable on the release stroke of the device to urge the discs 212, 212 into a pile against the bulkhead 204, as will be clearly apparent to those skilled in the art. It will be understood that the modification of Figure 6 may be utilized in combination with the embodiments of Figures 3 to 5.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a shock absorber, a cylinder comprising a wall intermediate the ends thereof dividing said cylinder into two chambers, a fluid medium within said cylinder, a central opening through said wall affording means of communication for said medium between said chambers, a plurality of passages through said wall around said opening, a tube slidably fitted within said opening and comprising a plurality of slots therethrough, a series of discs in one of said chambers sleeved over said tube around said slots, the disc at one end of said series bearing against said wall, a member connected to said tube and bearing against the disc at the opposite end of said series, means associated with said member for urging the same toward said wall and thereby urging said discs into engagement with one another, an annular valve plate in the other chamber, spring means for urging said plate against the adjacent extremities of said passages, said plate having a central opening aligned with the first-mentioned opening, a piston reciprocal within said other chamber, said discs being movable axially of said cylinder to create interstices therebetween on the closure stroke of said piston, said first-mentioned means comprising a rod bearing against said member and extending through the head of said cylinder in threaded engagement therewith.

2. In a shock absorber, a cylinder comprising a wall intermediate the ends thereof dividing said cylinder into two chambers, a fluid medium within said cylinder, a central opening through said wall affording means of communication for said medium between said chambers, a plurality of passages through said wall around said opening, a tube slidably fitted within said opening and comprising a plurality of slots therethrough, a series of discs in one of said chambers sleeved over said tube around said slots, the disc at one end of said series bearing against said wall, a member connected to said tube and bearing against the disc at the opposite end of said series, means associated with said member for urging the same toward said wall and thereby urging said discs into engagement with one another, an annular valve plate in the other chamber, spring means for urging said plate against the adjacent extremities of said passages, said plate having a central opening aligned with the first-mentioned opening, and a piston reciprocal within said other chamber, said discs being movable axially of said cylinder to create interstices therebetween on the closure stroke of said piston.

3. In a shock absorber, a cylinder comprising a wall intermediate the ends thereof dividing said cylinder into two chambers, a fluid medium within said cylinder, a central opening through said wall affording means of communication for said medium between said chambers, a plurality of passages through said wall around said opening, a tube slidably fitted within said opening and comprising a plurality of slots therethrough, a series of annular rigid discs in one of said chambers sleeved over said tube around said slots, the disc at one end of said series bearing against said wall, a member connected to said tube and bearing against the disc at the opposite end of said series, means associated with said member for urging the same toward said wall and thereby urging said discs into engagement with one another, an annular valve plate in the other chamber, spring means for urging said plate against the adjacent extremities of said passages, said plate having a central opening aligned with the first-mentioned opening, and a piston reciprocal within said other chamber, said first-mentioned means comprising a spring adjustably compressed against said member.

4. In a shock absorber, a cylinder comprising a wall intermediate the ends thereof dividing said cylinder into two chambers, a liquid medium within said cylinder, a central opening through said wall affording means of communication for said medium between said chambers, a plurality of passages through said wall around said opening, a tube slidably fitted within said opening and comprising a plurality of slots therethrough, a series of discs in one of said chambers sleeved over said tube around said slots, the disc at one end of said series bearing against said wall, a member connected to said tube and bearing against the disc at the opposite end of said series, means carried by said cylinder for urging said member against the associated disc, an annular valve pipe in the other chamber, spring means for yieldingly urging said plate against the adjacent extremities of said passages, and a piston reciprocal within said other chamber, said discs being spaced from each other axially of said cylinder to define interstices therebetween on the closure stroke of said piston.

5. An hydraulic shock strut comprising a cylinder member containing hydraulic fluid, a piston member reciprocal within said cylinder member, a low pressure chamber in one of said members, a high pressure chamber defined by portions of respective members and communicating with said low pressure chamber, whereby on one stroke of said strut, said fluid is forced from the high pressure chamber into the low pressure chamber, metering means carried by said one member for metering the flow of fluid from the high pressure chamber into the low pressure chamber on said stroke of the strut, said metering means comprising a stack of annular discs having aligned central openings communicating with the high pressure chamber and closed against communication with the low pressure chamber except through interstices between said discs, spring means carried by said one member for compressing said discs into tight abutment, said spring means being adapted to yield as said discs are urged apart during flow of said fluid through said interstices, one-way, by-pass valve means carried by said one member for accommodating flow of fluid from the low pressure chamber to the high pressure chamber independently of said metering means on another stroke of said strut, and spring means independent of the first-mentioned spring means and reacting between said members for yieldably resisting said one stroke of said strut and for actuating said strut on said other stroke thereof.

6. A hydraulic shock strut comprising a cylinder member containing hydraulic fluid, a piston member reciprocal within said cylinder member and defining therewith a high pressure chamber, a low pressure chamber in one of said members, said one member comprising a wall with a port connecting said chambers, an abutment on one side of said wall, a spaced abutment carried by said one member within the low pressure chamber in fixed relationship to the first-mentioned abutment, an axially expansible and contractible, pressure sensitive metering unit seated against the first-mentioned abutment, and comprising an axial passage connected to said port and radial passage means connected to said passage and to the low pressure chamber, said axial passage being closed against communication with the low pressure chamber except through said radial passage means, spring means compressed between and reacting against the second-mentioned abutment and said unit for yieldingly resisting axial expansion of the latter in response to variations in the pressure of the fluid flowing through said radial passage means, said passage means being adapted to increase in axial breadth during expansion of the unit and to decrease in axial breadth during contraction of the unit, said unit being the sole means for metering flow of said fluid from the high pressure chamber to the low pressure chamber, and by-pass valve means carried by said one member for accommodating flow of fluid from the low pressure chamber to the high pressure chamber, said by-pass valve means being adapted to positively prevent flow of hydraulic fluid therethrough from the high pressure chamber to the low pressure chamber.

7. A strut, according to claim 6, wherein the metering unit comprises a plurality of stacked rigid annular discs tapered toward their outer perimeters.

8. A strut, according to claim 6, wherein the metering unit comprises a plurality of annular dished resilient discs.

9. A strut, according to claim 6, wherein means are associated with the second-mentioned abutment for adjusting the compression of the spring means against the metering unit.

10. An hydraulic shock strut comprising a cylinder member containing hydraulic fluid, a piston member reciprocal within the cylinder member and defining therewith a high pressure chamber, a low pressure chamber in one of said members, said one member comprising a wall with a port connecting said chambers, an abutment at one side of said wall, a spaced abutment carried by said one member within the low pressure chamber in fixed relationship to the first-mentioned abutment during reciprocation of the piston member, an elongated, axially expansible and contractible, pressure sensitive, metering unit seated against the first-mentioned abutment, said unit, as seen in axial cross section, comprising a substantially axial passage connected to the port, and a multiplicity of radial passage means connecting the passage to the low pressure chamber, said axial passage being closed against communication with the low pressure chamber except through said radial passage means, and said unit comprising resilient means compressed between and reacting against the abutments for yieldingly resisting axial expansion of the unit in response to variations in the pressure of fluid flowing through said radial passage means, said passage means being adapted to increase in axial breadth during expansion of the unit and to decrease in axial breadth during contraction of the unit, said passage and passage means being the sole means for metering flow of said fluid from the high pressure chamber to the low pressure chamber, and by-pass valve means carried by said one member for accommodating flow of said fluid from the low pressure to the high pressure chamber, said by-pass valve means being adapted to positively prevent flow of hydraulic fluid therethrough from the high pressure chamber to the low pressure chamber.

11. An hydraulic shock strut, according to claim 10, wherein means are provided for adjusting the distance between the abutments.

RAYMOND WATTS.

REFERENCES CITED

The following references are of record in the file of this patent:

UNITED STATES PATENTS

| Number | Name | Date |
|---|---|---|
| Re. 5,431 | Field | June 3, 1873 |
| Re. 18,696 | Messier | Dec. 20, 1932 |
| 1,029,097 | Atkinson | June 11, 1912 |
| 1,351,141 | Thompson | Aug. 31, 1920 |
| 1,534,212 | Hess | Apr. 21, 1925 |
| 1,704,527 | Becker | Mar. 5, 1929 |
| 1,792,695 | Lewis | Feb. 17, 1931 |
| 2,069,791 | Wallace | Feb. 9, 1937 |
| 2,255,181 | Newton | Sept. 9, 1941 |
| 2,336,137 | Thornhill | Dec. 7, 1943 |
| 2,352,351 | Thornhill | June 27, 1944 |

FOREIGN PATENTS

| Number | Country | Date |
|---|---|---|
| 10,945 | Austria | Feb. 25, 1903 |
| 630,128 | Germany | May 20, 1936 |
| 832,973 | France | July 25, 1938 |

Certificate of Correction

Patent No. 2,471,294.                                                                                                 May 24, 1949.

RAYMOND WATTS

It is hereby certified that errors appear in the printed specification of the above numbered patent requiring correction as follows:

Column 2, line 48, for "sprink" read *spring*; column 4, line 63, for "aboutment" read *abutment*; column 7, line 33, for the word "pipe" read *plate*;

and that the said Letters Patent should be read with these corrections therein that the same may conform to the record of the case in the Patent Office.

Signed and sealed this 18th day of October, A. D. 1949.

[SEAL]

THOMAS F. MURPHY,
*Assistant Commissioner of Patents.*